United States Patent
Cotevino et al.

(10) Patent No.: US 8,472,929 B2
(45) Date of Patent: Jun. 25, 2013

(54) METHOD AND SYSTEM FOR PROVIDING PRESENCE INFORMATION

(75) Inventors: Agostino Cotevino, Turin (IT); Marco Gaspardone, Turin (IT)

(73) Assignee: Telecom Italia S.p.A., Milan (IT)

( * ) Notice: Subject to any disclaimer, the term of this patent is extended or adjusted under 35 U.S.C. 154(b) by 732 days.

(21) Appl. No.: 12/226,485

(22) PCT Filed: Apr. 21, 2006

(86) PCT No.: PCT/EP2006/061755
§ 371 (c)(1),
(2), (4) Date: May 8, 2009

(87) PCT Pub. No.: WO2007/121783
PCT Pub. Date: Nov. 1, 2007

(65) Prior Publication Data
US 2009/0275314 A1    Nov. 5, 2009

(51) Int. Cl.
*H04M 3/42* (2006.01)
(52) U.S. Cl.
USPC .............. 455/414.2; 455/414.1; 455/414.3
(58) Field of Classification Search
USPC .......... 455/404.2, 412.2, 414.2, 422.1, 432.3, 455/433, 435.1, 440, 456.1, 456.2, 518, 519; 370/338; 379/265.06; 709/202, 203, 205, 709/206, 207, 227
See application file for complete search history.

(56) References Cited

U.S. PATENT DOCUMENTS

| | | | |
|---|---|---|---|
| 2001/0031641 A1 | 10/2001 | Ung et al. | |
| 2003/0154293 A1* | 8/2003 | Zmolek | 709/228 |
| 2003/0217098 A1* | 11/2003 | Bobde et al. | 709/202 |
| 2004/0080036 A1 | 4/2004 | Chang et al. | |
| 2004/0267939 A1 | 12/2004 | Yumoto et al. | |
| 2005/0265296 A1 | 12/2005 | Zhang et al. | |
| 2006/0031368 A1 | 2/2006 | Decone | |

FOREIGN PATENT DOCUMENTS

| | | |
|---|---|---|
| CN | 1499789 | 5/2004 |
| WO | WO 02/065250 A2 | 8/2002 |
| WO | WO 2004/080036 A2 | 9/2004 |
| WO | WO 2004/080036 A3 | 9/2004 |

OTHER PUBLICATIONS

3GPP TS 23.141 v7.1.0, "3$^{rd}$ Generation Partnership Project; Technical Specification Group Services and System Aspects; Presence Service; Architecture and Functional Description," Release 7, pp. 1-36, (Dec. 2005).

(Continued)

*Primary Examiner* — Wesley Kim
*Assistant Examiner* — Dinh P Nguyen
(74) *Attorney, Agent, or Firm* — Finnegan, Henderson, Farabow, Garrett & Dunner, L.L.P.

(57) ABSTRACT

A method for providing presence information associated with a first user of a telecommunications network, includes collecting from at least one network apparatus user-related data adapted to build the presence information; and publishing the collected user-related data. The publishing includes arranging the collected user-related data in the presence information and making it available to at least a second user. The collecting of the user-related data from the network apparatus is conditioned to the receipt from the second user of a request for providing the presence information for the first user.

22 Claims, 7 Drawing Sheets

OTHER PUBLICATIONS

3GPP TS 24.141 v7.0.0, "3rd Generation Partnership Project; Technical Specification Group Core Network; Presence Service Using the IP Multimedia (IM) Core Network (CN) Subsystem," Stage 3, Release 7, pp. 1-131, (Dec. 2005).

ETSI TS 123 141 v7.1.0, "Universal Mobile Telecommunications System (UMTS); Presence Service; Architecture and Functional Description," Stage 2, 3GPP TS 23.141 version 7.1.0 Release 7, pp. 1-37, (Dec. 2005).

Niemi, A., "Session Initiation Protocol (SIP) Event Notification Extension for Notification Throttling," Network Working Group, Internet-Draft Center, Expires: Sep. 7, 2006, Nokia Research, 23 pages, (Mar. 6, 2006).

* cited by examiner

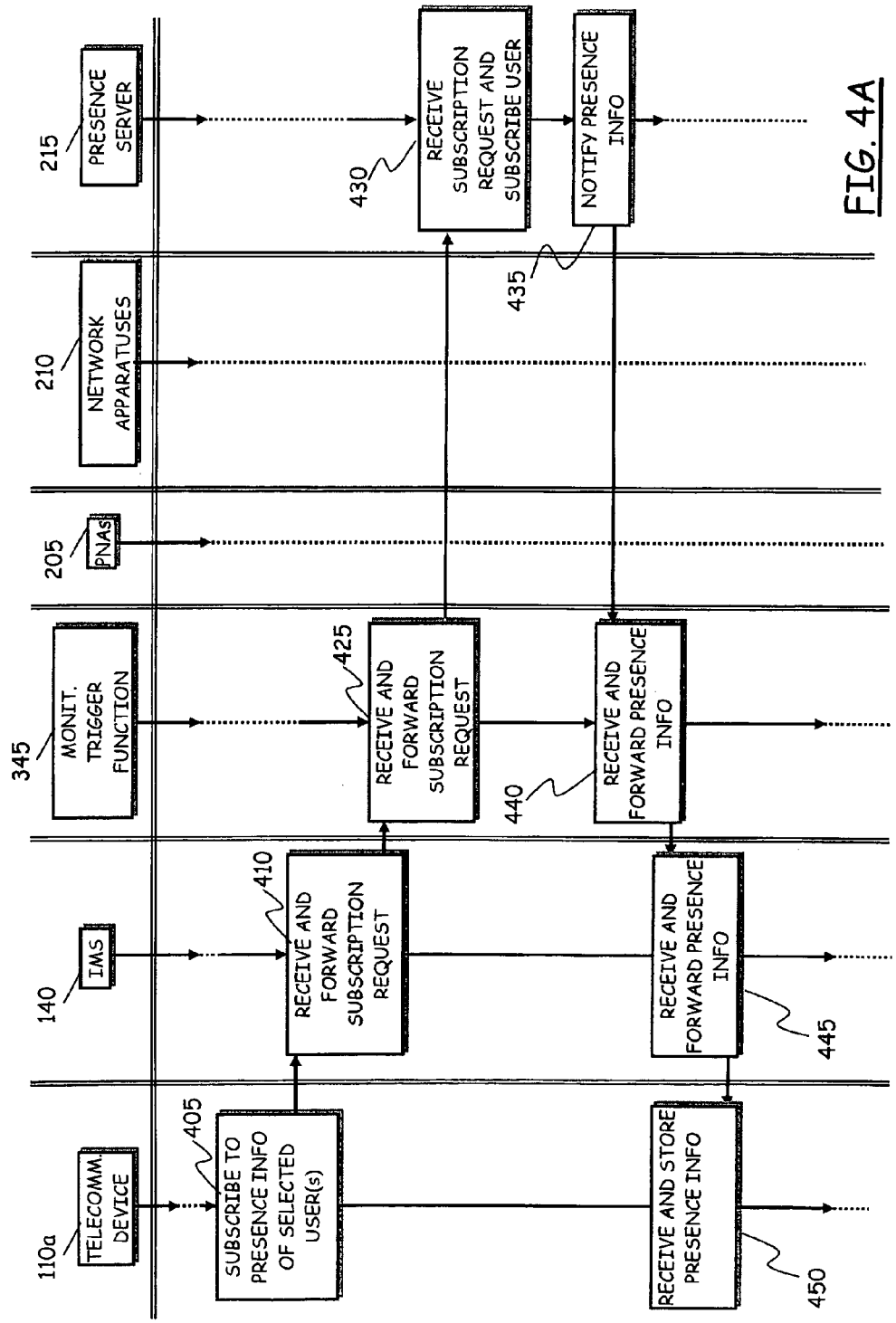

METHOD AND SYSTEM FOR PROVIDING PRESENCE INFORMATION

CROSS REFERENCE TO RELATED APPLICATION

This application is a national phase application based on PCT/EP2006/061755, filed Apr. 21, 2006.

FIELD OF THE INVENTION

The present invention relates in general to the field of telecommunications technologies and telecommunications networks. In particular, the invention concerns presence services, and more specifically methods and systems for providing presence information associated with users of telecommunications devices.

DESCRIPTION OF THE RELATED ART

Services of "presence", or "presence services" are known in the field of telecommunications. A presence service is intended to provide, to users of a telecommunications network, indications (referred to as "presence information") about other telecommunications network users concerning the availability and willingness of those other users to communicate. The Presence information concerning a generic user may for example include indications about the current connection of the user's telecommunication device to the telecommunications network (e.g., telecommunication device turned on or off, or out of network coverage, in the exemplary case of wireless telecommunications networks), as well as communication preferences, capabilities of the user's telecommunication device, current activities of the user, current localization of the user, current user's mood, and so on.

Presence services allow for example the users of telecommunications devices to set up "buddy" lists, including other users with whom the user wishes to stay in closer relationship; presence services are for example exploited in "instant messaging" services.

Data exploited for deriving presence information may be provided directly by the user, or by the user's telecommunication device (e.g., by means of specifically-designed client applications running on the telecommunication devices), or by network apparatuses, adapted to get knowledge of the status/profile of a user. Typically, several distinct network apparatuses have knowledge of a part of the data that are used to build up the presence information of a generic user, so that the data available at the different apparatuses are spread and often loosely correlated, or even totally uncorrelated.

As far as mobile telecommunications networks are concerned, and particularly second and third generation mobile telephony networks, presence services are standardized in the 3GPP ($3^{rd}$ Generation Partnership Project) TS (Technical Specification) 23.141 release 7.1.0, entitled "Presence Service; Architecture and functional description" and TS 24.141 release 7.0.0, entitled "Presence service using the IP Multimedia (IM); Core Network (CN) subsystem; Stage 3", both available for download (at the filing date of the present application) on the Web site www.3gpp.org. In particular, the TS 24.141 discloses the implementation of presence services in mobile telephony networks using the IP (Internet Protocol) Multimedia Subsystem (IMS) infrastructure; as known to those skilled in the art, the IMS is an IP multimedia and telephony control network based on SIP (Session Initiation Protocol).

In TS 23.141 a network-located element called Presence Network Agent (PNA) is defined that collects and sends network-related presence information to a presence server. In other words, the PNAs are designed to interrogate network apparatuses for collecting therefrom data about the users, and publish the gathered data on the presence server. The presence server gathers the data received from the different PNAs, as well as the data received directly from the user/user's telecommunication device, to build the presence information. Thus, the presence server acts as a database that receives, arranges and stores, as presence information, the data provided by the PNAs and the telecommunication devices of the users; the presence server then notifies, distributes the stored presence information to requesting entities/applications.

The U.S. published patent application No. 2006/0031368 describes a presence management system for a cellular-based Push-to-Talk (PTT) service. The PTT infrastructure obtains presence-relevant network status information from elements of the cellular network and of the overlying data network such as the home location registers (HLRs) of the mobile switching centers (MSCs) and the Authentication Authorization and Accounting (AAA) element of the data network. Additionally, the presence management system may communicate with other networked resources such as a Short Messaging Service (SMS) center, a Mobile Instant Messaging (MIM) server, a Multimedia Messaging Service (MMS) center, a BREW download server, or others, to obtain information about the activities of subscriber mobile phones that can be used to determine their presence. The presence management system operates in accordance with a set of configurable rules to update presence status and to provide PTT subscribers with presence status updates. Presence updates can be delivered to subscribers via Short Messaging Service (SMS) messaging or via sessions over the data network. The updates can be made in conjunction with or after a PTT call session or attempted session or can be initiated by the presence management system or a subscriber mobile phone independently of call activity.

The U.S. published patent application No. 2001/0031641 discloses a technique and apparatus to provide status tracking of presence and/or location of a mobile, wireless device to a requesting entity even outside of a particular wireless system. This allows wireless service providers the ability to monitor and log changes in the status of mobile stations within and/or outside their networks. Embodiments are disclosed wherein presence and/or location information is provided to entities outside of a particular servicing wireless network using the mechanisms of call processing components of a mobile network (e.g., call setup procedures), and using standard mechanisms currently available to any appropriately conforming Mobile Switching Center (MSC) element. In one disclosed embodiment, a wireless chat tracking system is implemented which utilizes a change in mobile registration status to automatically notify a chat group system outside the wireless network of current status information activity regarding a relevant device, e.g., registration activity or inactivity timeout. In the wireless chat automatic status tracking system, a registration notification (REGNOT) message is either explicitly forwarded or copied to an external IP based application (e.g., to a mobile chat group system). The change in mobile registration is communicated via a suitable signaling link (e.g., SS7, TCP/IP, etc.) between a Home Location Register (HLR) and the chat group system. Therefore, instead of a conventionally dosed system using SS7 messages, REGNOT messages are pushed out over TCP/IP connections to external applications (e.g., chat servers) to automatically notify the external system of the location of a particular user.

The International application No. WO 2004/080036 describes a telecommunications system including a telephone routing system and a presence database manager unit operably coupled to the routing system and adapted to maintain one or more watcher lists of registered users. The routing system is adapted to receive phone calls and provide an indication to the presence database manager unit whether the phone calls originate from registered users. The presence database manager unit is adapted to determine if such a user has a watcher list and transmit an indication to parties associated with the watcher list that said user is present.

The U.S. published patent application No. 2004/0267939 discloses a network system that includes a session control server and a presence server. The session control server includes a presence information update unit that is started when the status changes and notifies the presence server of the changed status. The presence server includes a presence information control unit that controls the consistency of the notified update information.

SUMMARY OF THE INVENTION

The Applicant has observed that a critical aspect in the implementation of presence services resides in the fact that the presence information is intrinsically dynamic in nature, because the users' status is subjected to vary frequently.

The above problem is exacerbated in the case the presence services are offered by operators of telecommunications networks like telephony networks: in that case, the number of users in respect of whom it is necessary to keep updated presence information in the presence server may be very high, of the order of several millions.

These pose problems for the design and operation of the PNAs.

For example, the PNAs should be able to manage the collection and publishing of data related to very large number of users, and the inquiries by the PNAS to the network apparatuses whereat the users' data are available may become so numerous and so frequent, that the network may be overloaded, and its operation impaired.

The presence server is also impacted: keeping presence information in respect of such large numbers of users causes the database at the presence server to easily become huge and hardly manageable.

The Applicant has understood that, for a practical and efficient implementation of presence services, especially in scenarios like telephony networks, it is important to limit the number of users monitored by the PNAs, and to limit the frequency with which the presence information published on the presence server are updated.

The Applicant has realized that in order to reduce the impact of that implementation of a presence service on a telecommunications network, it is expedient to condition the collection of user-related data by the presence network agents from the network apparatuses to the fact that the presence information of the generic user in respect of which data are to be collected have been requested by someone: if no one is interested in the presence information in respect of a certain user, there is no reason to collect data and publish them on the presence server.

According to an aspect of the present invention, there is provided a method as follows.

The method is adapted to provide presence information associated with a first user of a telecommunications network, and comprises collecting from at least one network apparatus user-related data adapted to build the presence information; and publishing the collected user-related data, wherein said publishing comprises arranging the collected user-related data in the presence information.

The method is characterized by further comprising conditioning said collecting to the receipt from at least a second user of a request for providing the presence information for said first user.

Thanks to this method, it is possible to reduce the load of the presence network agents on the network, limiting the frequency by which the network apparatuses are inquired for retrieving data useful to build-up the presence information. The amount of data published on the presence server is also reduced.

According to a second aspect of the present invention, there is a system for providing presence information associated with a first user of telecommunications network.

The system comprises:

at least one presence network agent operatively associated with at least one network apparatus and adapted to collect from the network apparatus user-related data adapted to build the presence information; and a presence server operatively associated with the at least one presence network agent and adapted to receive therefrom the collected user-related data and to arrange the collected user-related data in the presence information.

A network function is further provided, adapted to condition said collecting by the at least one presence network agent to the receipt from at least a second user of a request for providing the presence information for said first user.

According to a further aspect of the present invention, a method as set forth in appended claim 23 is further provided, for collecting user-related data related to a first user of a telecommunications network from at least one network apparatus, wherein said user-related data are adapted to be published for building presence information associated with said first user.

Said collecting is conditioned to the receipt from at least a second user of a request for providing the presence information for said first user.

According to a still further aspect of the present invention, a presence network agent is adapted for use in a telecommunications network implementing a presence service. The presence network agent is adapted to be operatively associated with at least one network apparatus and to collect therefrom user-related data to a first user and adapted to build the presence information associated with the first user, and to publish the user-related data.

The presence network agent is also adapted to condition said collecting to the receipt from at least a second user of a request for providing the presence information for said first user.

BRIEF DESCRIPTION OF THE DRAWINGS

The features and advantages of the present invention will be made apparent by the following detailed description of an embodiment thereof, provided merely by way of non-limitative example, description that will be conducted making reference to the annexed drawings, wherein:

FIGS. 4A and 4B show a schematic flowchart illustrating actions performed in carrying out a method according to an embodiment of the present invention;

DETAILED DESCRIPTION OF THE PREFERRED EMBODIMENT(S)

In the following description, reference will be made by way of example to a mobile telecommunications system, particularly a system including a GERAN (GSM/EDGE Radio Access Network, wherein EDGE stands for Enhanced Data for GSM Evolution) i.e. a mobile communications network in which the radio access network portion (the radio front-end towards the users) is based on the GSM/GPRS standard, or a UTRAN (UMTS Terrestrial RAN, where UMTS stands for Universal Mobile Telecommunications system) PLMN (Public Land Mobile Network); however, it is pointed out that this has not to be construed as a limitation of the present invention, which can be applied in general to any kind of PLMN, irrespective of the radio access type, and more generally to any kind of telecommunications network, either wired or wireless.

Figure 1:
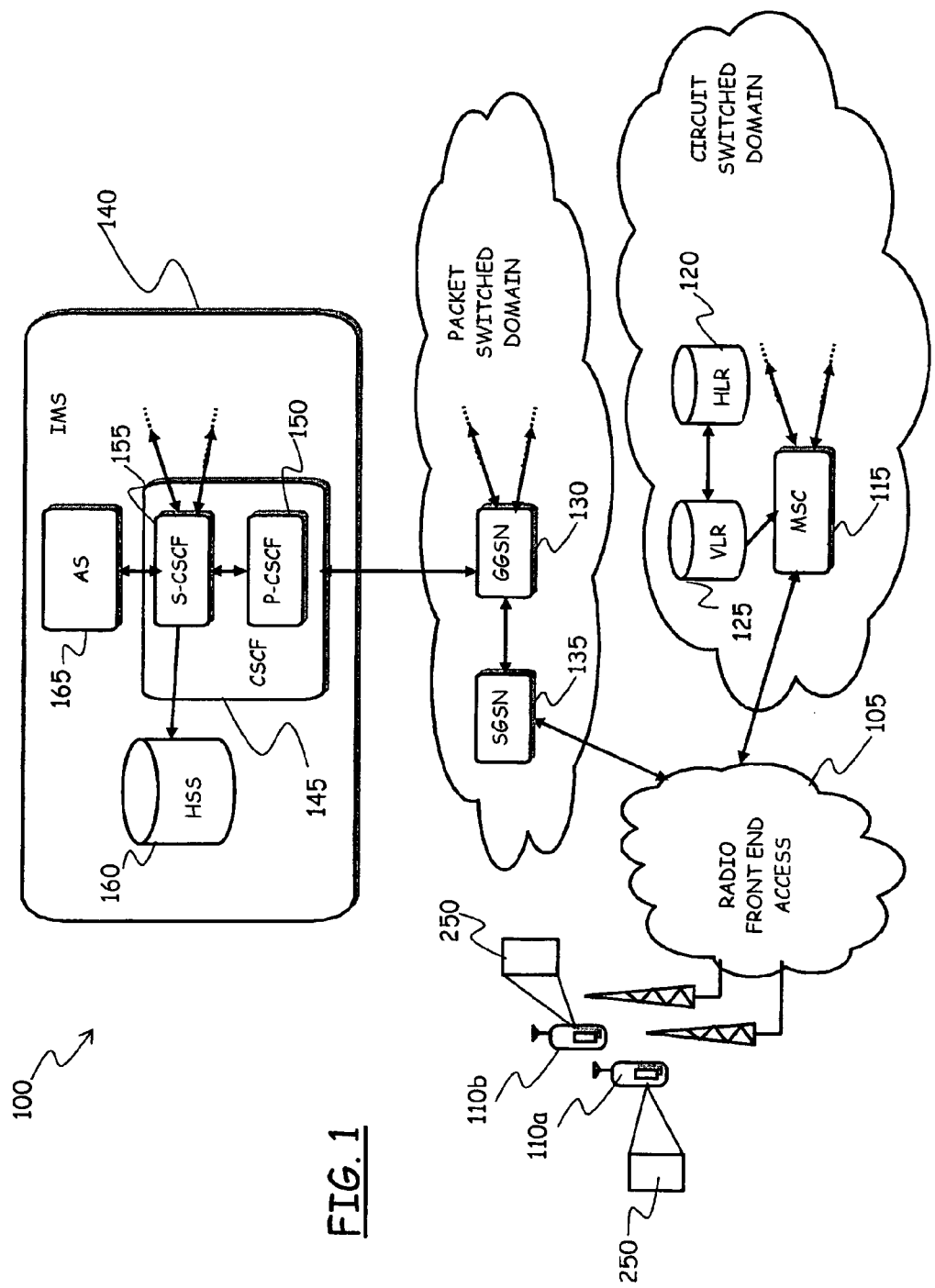
FIG. 1 schematically shows an exemplary mobile telecommunications network scenario wherein the present invention is applicable.

Referring to the drawings, FIG. 1 schematically shows a mobile telecommunications network 100 wherein a presence service according to an embodiment of the present invention is implemented.

The mobile telecommunications network 100 comprises a radio access network portion (radio front-end) for allowing mobile telecommunications devices, like the two devices 110a and 110b shown in the drawing, e.g. GSM/GPRS or GSM/EDGE or UMTS mobile phones, accessing the network. In the drawing, the radio front-end is not depicted in detail, being per-se known and not essential for the understanding the present invention, and is identified by reference numeral 105, with associated antennas.

The specific structure of the radio front-end of the mobile communications network 100 depends on the network type: in the exemplary case of a GSM or UMTS network, the radio front-end 105 comprises a plurality of Base Station Subsystems (BSSs), each one providing coverage for mobile communications in a respective geographic region. The generic BSS comprises a plurality of Base Transceiver Stations (BTSs) or Nodes-B, each one covering a respective geographic area (a so-called "cell") within the region covered by the BSS; the generic BTS or Node-B communicates with the mobile telecommunication devices which are located in the BTS's cell or Node-B. Typically, many BTSs are connected to a same Base Station Controller (BSC) or Radio Network Controller (RNC), a network unit that controls the BTSs. Groups of different BSSs are connected to respective Mobile Switching Centers (MSCs), like the MSC 115 shown in the drawing; the generic MSC performs the function of gateway to other MSCs of the same mobile telecommunications network, and/or to the MSCs of other mobile telecommunications networks, and/or to exchanges of one or more wired, PSTNs (Public Switched Telephone Networks). Managing, particularly routing of the calls is accomplished based on information contained in a Home Location Register (HLR) 120, containing subscription data of users subscribed to the mobile telecommunications network 105, particularly mobile phone numbers, and in Visitor Location Registers (VLR), associated with the MSCs, like the VLR 125 depicted in the drawing, containing information on where the various users are located at a given time.

The MSCs, with the HLR and the VLRs are part of a circuit-switched domain of the mobile telecommunications network 100.

FIG. 1 also depicts schematically core network elements that implement a packet-switched domain of the mobile telecommunications network 100. The packet-switched domain is operatively associated with the circuit-switched domain and with the radio front-end. In particular, in the exemplary case of the GPRS standard, and without entering into excessive details, known per-se in the art and not relevant to the understanding of the invention embodiment herein described, Gateway GPRS Support Nodes (GGSN), like the GGSN 130 in the drawing, act as an interface between the mobile telecommunications network and one or more packet data networks, such as the Internet or an intranet, or the packet-switched domains of other network operators. The GGSNs exchange data packets, through a GPRS backbone network, with Serving GPRS Support Nodes (SGSN), such as the SGSN 135 shown in the drawing. The generic SGSN is associated with one or more respective BSSs, and routes the data packets received from the GGSNs to the mobile telecommunication devices, located in the geographic area covered by the respective BSS (or by one of the respective BSSs). The data packets, received from the SGSN, are converted into data streams adapted to being transmitted "over the air", by one of the BTSs, exploiting the radio resources of the mobile communications network; similarly, data streams transmitted by the mobile devices over the air and received by the BTS are converted into data packets, for transmission to the respective SGSN.

A 3GPP-compliant IP Multimedia Subsystem (IMS) infrastructure 140 is provided, associated with the packet-switched domain of the mobile telecommunications network. The basic elements of the IMS infrastructure 140 are depicted schematically in FIG. 1, and include Call Session Control Functions (CSCFs), like the CSCF 145 shown in the drawing; without entering into details, the CSCFs include Proxy Call Session Control Functions (P-CSCFs), like the P-CSCF 150 shown in the drawing, connected to respective Serving Call Session Control Functions (S-CSCFs), like the S-CSCF 155. Essentially, the P-CSCFs are the interface between the mobile telecommunications devices and the IMS infrastructure, and behave as proxies, accepting requests from the mobile devices and internally managing or forwarding them to, e.g., the S-CSCFs; the S-CSCFs can in turn behave as proxies, accepting the incoming requests and managing them internally, or forwarding them to other elements of the IMS infrastructure, such as the Interrogating Call State Control Functions (I-CSCFs, not shown in the drawing), which are the contact to operator's network and take care of assigning S-CSCFs to the users for the registration of the SIP (Session Initiation Protocol) type, routing SIP requests, retrieving S-CSCFs' addresses, through a Home Subscriber Server—HSS, schematically shown in the drawing and identified therein as 160. The S-CSCFs colloquiate with (an) application server(s) AS 165, wherein applications run for providing specific services.

A presence service is implemented in the mobile telecommunications network 100. In particular, it is assumed that the implemented presence service is compliant to the prescriptions of the above-mentioned 3GPP technical specifications.

Figure 2:
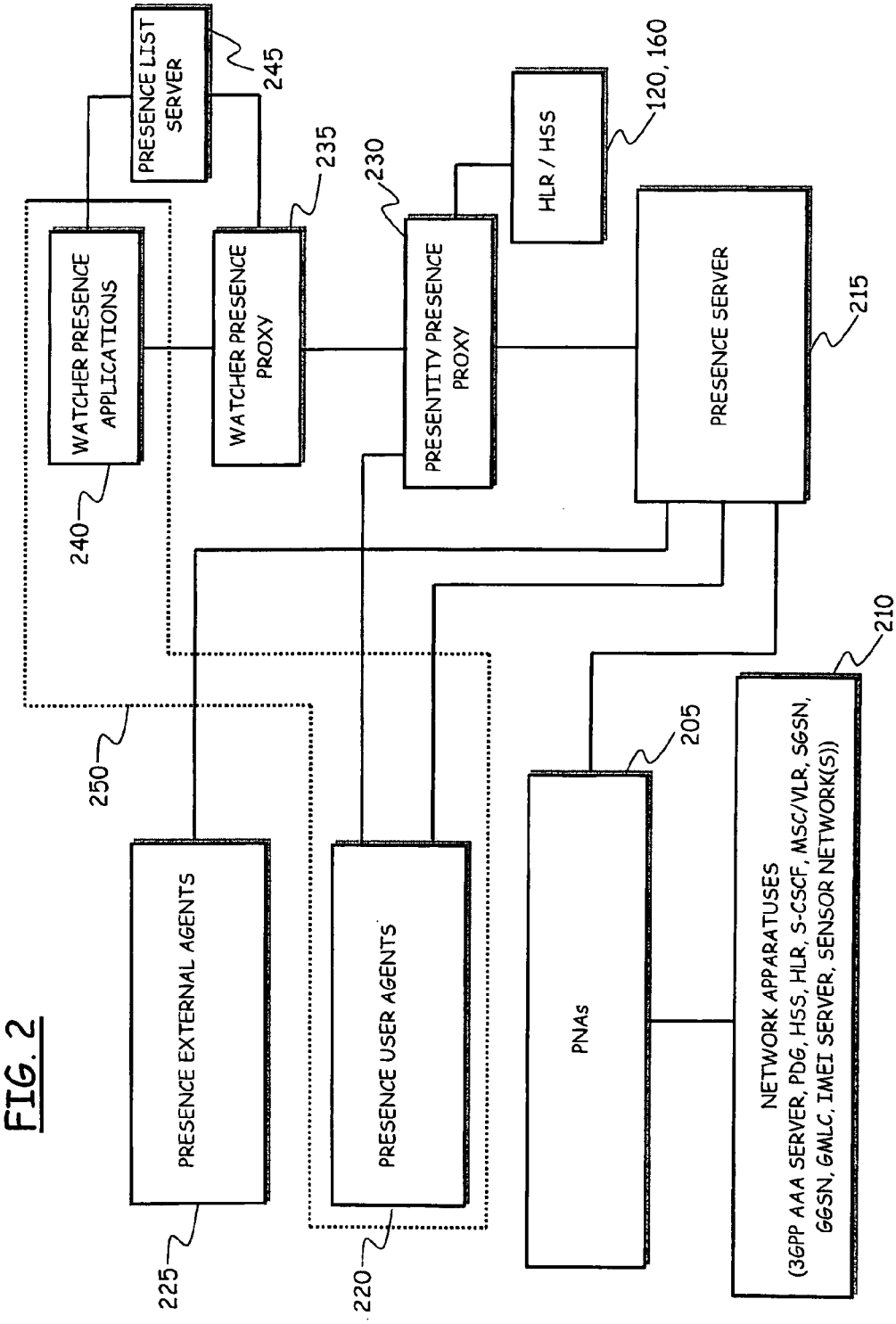
FIG. 2 schematically shows, in terms of interconnected functional blocks, an architectural model for a presence service as set forth by the 3GPP standards.

Referring to FIG. 2, an architectural model of the presence service is depicted, in terms of interconnected functional blocks. It is pointed out that one or more of the functional blocks depicted in FIG. 2 may in the practice be implemented totally in hardware, totally in software/firmware, or partly in hardware and partly in software.

A plurality of PNAs 205 is provided, each PNA being adapted to interrogate one or more respective network apparatuses of the network 100, schematized in the drawing as a single block 210; in particular, the PNAs 205 may interrogate and retrieve data from the MSCs (and the associated VLRs), the HLR, the HSS, the SGSN, the GGSN, the S-CSCF, as well as other network apparatuses (not depicted in FIG. 1), like a 3GPP AAA (Authentication, Authorization and Accounting) server, a PDG (Packet Data Gateway), a GMLC (Gateway Mobile Localization Center), an IMEI (International Mobile Equipment Identity) server, a sensor network. Each PNA is adapted to retrieve, from the respective network apparatus(es) to which it is connected, data useful for building up the presence information in respect of the users of, in the example herein considered, the mobile telecommunications network 100. In the practice, the data that the PNAs may retrieve from the network apparatuses are determined by the type and number of network apparatuses owned by the network operator. In particular, and merely by way of example, a PNA may retrieve from the HLR the information concerning the on/off status of the user of a certain mobile telecommunication device (the off status may mean out of the network coverage); alternatively or in addition, information about the additional network services associated with the user, and/or macro-localization information may as well be retrieved from the HLR. A PNA may retrieve, from a geographic localization platform used by the network operator (e.g., a GSM, Wi-Fi, GPS localization platform) data related to the geographic localization of the user of a mobile telecommunication device. A PNA may retrieve, from the IMEI server, information about the type of telecommunication device of the user, like the model, the release of the software (e.g., operating system) installed thereon, and the like; this information is for example useful to establish which services are supported by the telecommunication device, or for sending properly formatted messages. A PNA may retrieve data from a sensor network; this information is for example useful to establish the context of the user (user at home, at work, weather conditions, and the like).

The PNAs 205 send the retrieved data to a presence server 215 (the PNAs "publish" the data on the presence server 205). In particular, according to the 3GPP prescriptions, in order to publish the available data on the presence server, the PNAs exploit SIP messages called "PUBLISH" messages.

The presence server 215 is also adapted to receive data useful to build up the users' presence information directly from the users, through presence user agents 220 running on the users' mobile telecommunications devices, as well as from presence external agents 225, like presence servers of other network operators.

The presence server 215 is not adapted to directly interrogate the network apparatuses 210, the users' mobile telecommunication devices or the presence external agents; the presence server 215 is instead adapted to receive data from one or more of this entities, to arrange the received data in users' presence information, and to store it. For example, according to the 3GPP prescriptions, the presence information in respect of a generic user consists of a t-uple and includes: person information (communicated directly by the user, through his/her telecommunication device), service information (indicating for example to which services the user has subscribed) and device information (indicating the type of the telecommunications device).

The presence server 215 is also adapted to disseminate the users' presence information to requesting entities (apparatuses or applications). In particular, the 3GPP standard architectural model provides for a presentity presence proxy 230 and a watcher presence proxy 235, allowing watcher applications 240, which are client applications running on the users' telecommunications devices and designed to retrieve the presence information in respect of the other users specified by the user of the telecommunications devices, to locate the correct presence server (exploiting the information contained in the HLR and the HSS).

One of the watcher applications 240, possibly together with a respective presence user agent 220, form a presence service client software 250 installed and running on the users' telecommunications devices (see also FIG. 1).

Typically, presence services allow a user of a telecommunication device to build up a buddy list including all the other users of which it is desired to have presence information. A presence list server 245 may be provided in the network, wherein buddy lists may be stored.

As discussed in the foregoing, the Applicant has observed that a critical aspect in the implementation of presence services resides in the fact that the presence information is intrinsically dynamic in nature, because the users' status varies frequently. This problem is exacerbated in the case the presence services are offered by operators of telecommunications networks, like telephony networks: in that case, the number of users in respect of whom it is necessary to keep updated presence information in the presence server may be very high, of the order of several millions. This poses problems for the design and operation of the PNAs; for example, designing PNAs able to manage the collection and publishing of data related to very large number of users is hard, and the inquiries by the PNAs to the network apparatuses 210 whereat the users' data are available may become so numerous and so frequent, that the network may be overloaded, and its operation impaired. Also, keeping presence information in respect of such large numbers of users causes the database at the presence server to easily become huge and hardly manageable.

The Applicant has understood that, for a practical and efficient implementation of presence services, especially in scenarios like telephony networks, it is important to limit the number of users monitored by the PNAs, and to limit the frequency with which the presence information published on the presence server are updated.

The Applicant has observed that a possible way to achieve these goals would be to set up a provisioning chain adapted to provide to the PNAs with the list of users that have subscribed for the presence service and that are to be monitored; however, this solution may result too complicated, because the subscriber list is reasonably expected to constantly vary, and thus the local copies thereof available at the PNAs should be constantly kept updated.

The Applicant has realized that in order to reduce the impact of the implementation of a presence service on a telecommunications network, it is expedient to condition the collection of user-related data by the presence network agents from the network apparatuses to the fact that the presence information of the generic user in respect of which data are to be collected have been requested by someone: if no one is interested in the presence information in respect of a certain user, there is no reason to collect data and publish them on the presence server.

Hereinafter, two embodiments of the present invention will be described, which allow achieving the goals stated above.

Figure 3:
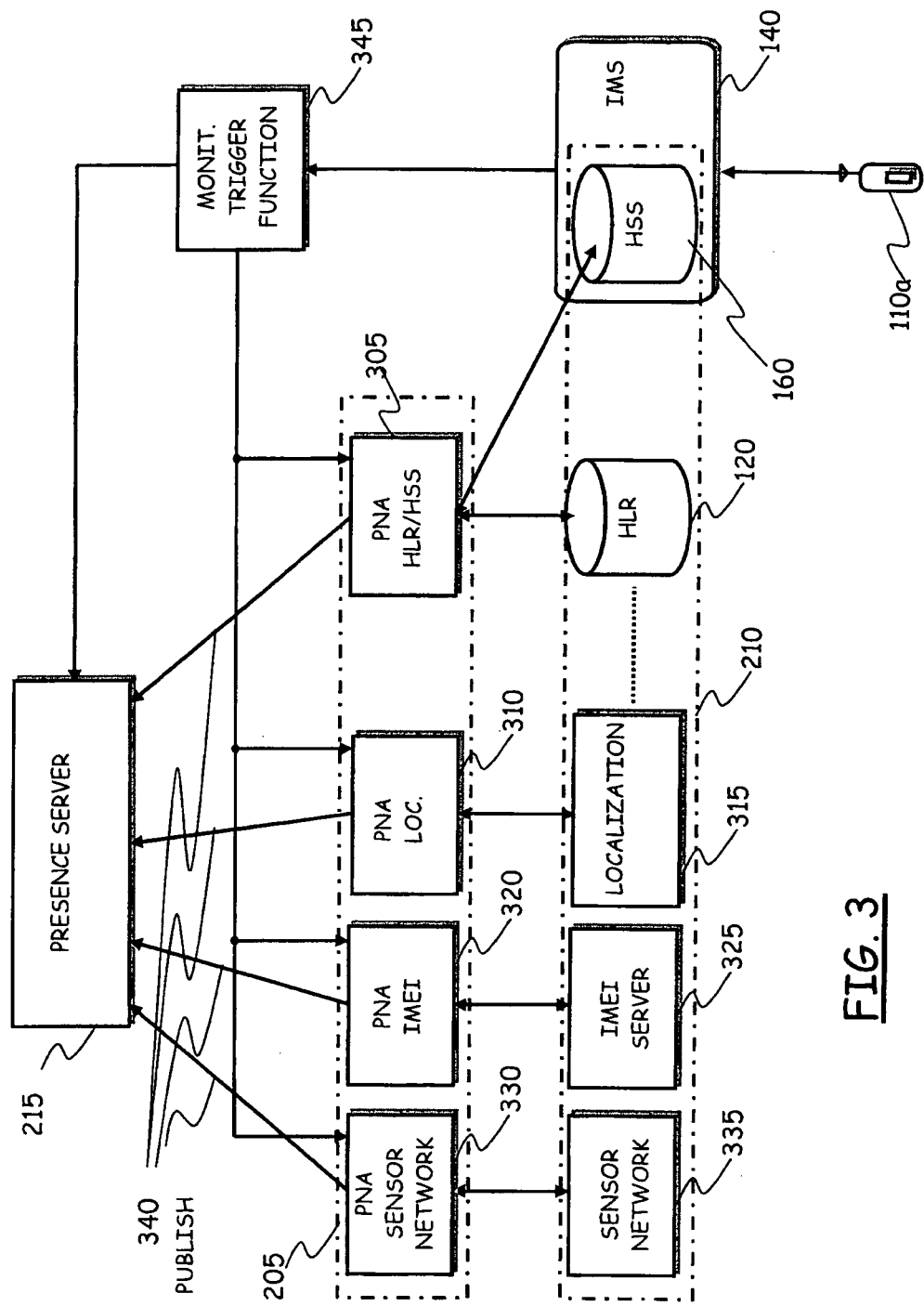
FIG. 3 schematically shows, in terms of functional blocks, a presence service platform according to an embodiment of the present invention.

In FIG. 3 there is schematically shown a presence service platform according to a first embodiment of the present invention. In this drawing, some of the elements already shown in FIGS. 1 and 2 are depicted, namely the plurality of PNAs 205, the complex of network apparatuses 210, including the HLR 120, the HSS 160, the presence server 215, and the IMS infrastructure 140. In FIG. 3, merely by way of example, some of the PNAs of the plurality 205 have been explicitly shown, particularly a PNA 305 adapted to interrogate the HLR 120 and the HSS 160, a PNA 310 adapted to interrogate a geographic localization platform 315, a PNA 320 adapted to interrogate an IMEI server 325, and a PNA 330 adapted to interrogate a sensor network 335. The PNAs are adapted to publish the retrieved data on the presence server 215 by means of PUBLISH SIP messages.

According to an embodiment of the present invention, a network function 345 is provided, particularly a monitoring trigger function, adapted to interact with the IMS platform 140, the PNAs 205, and the presence server 215. In particular, the monitoring trigger function 345 is adapted to instruct the PNAs 205 about when collecting and publishing data in respect of a certain user should be started.

In an embodiment of the present invention, the monitoring trigger function 345 may be implemented in the form of a proxy, i.e. a network entity having an associated address (typically, an IP address), which may act as a server for managing requests originated by other entities (clients) and/or as a client for the purpose of making requests on behalf of other clients. In particular, the monitoring trigger function 345 may act as a message destination for (SIP) messages issued by the (CSCF of the) IMS infrastructure and the presence server. Acting as a proxy, upon receipt of a message the monitoring trigger function 345 may perform predetermined manipulations on the received message, for example by modifying the field(s) related to the message routing, so as to always be involved in the exchange of messages.

In alternative embodiments of the invention, the monitoring trigger function 345 may be implemented as a message interceptor (like a "sniffer"), i.e. a network entity that is a transparent entity for the message traffic, but is adapted to sense the messages exchanged between the IMS infrastructure and the presence server, so as to detect specific messages.

Figure 4B:
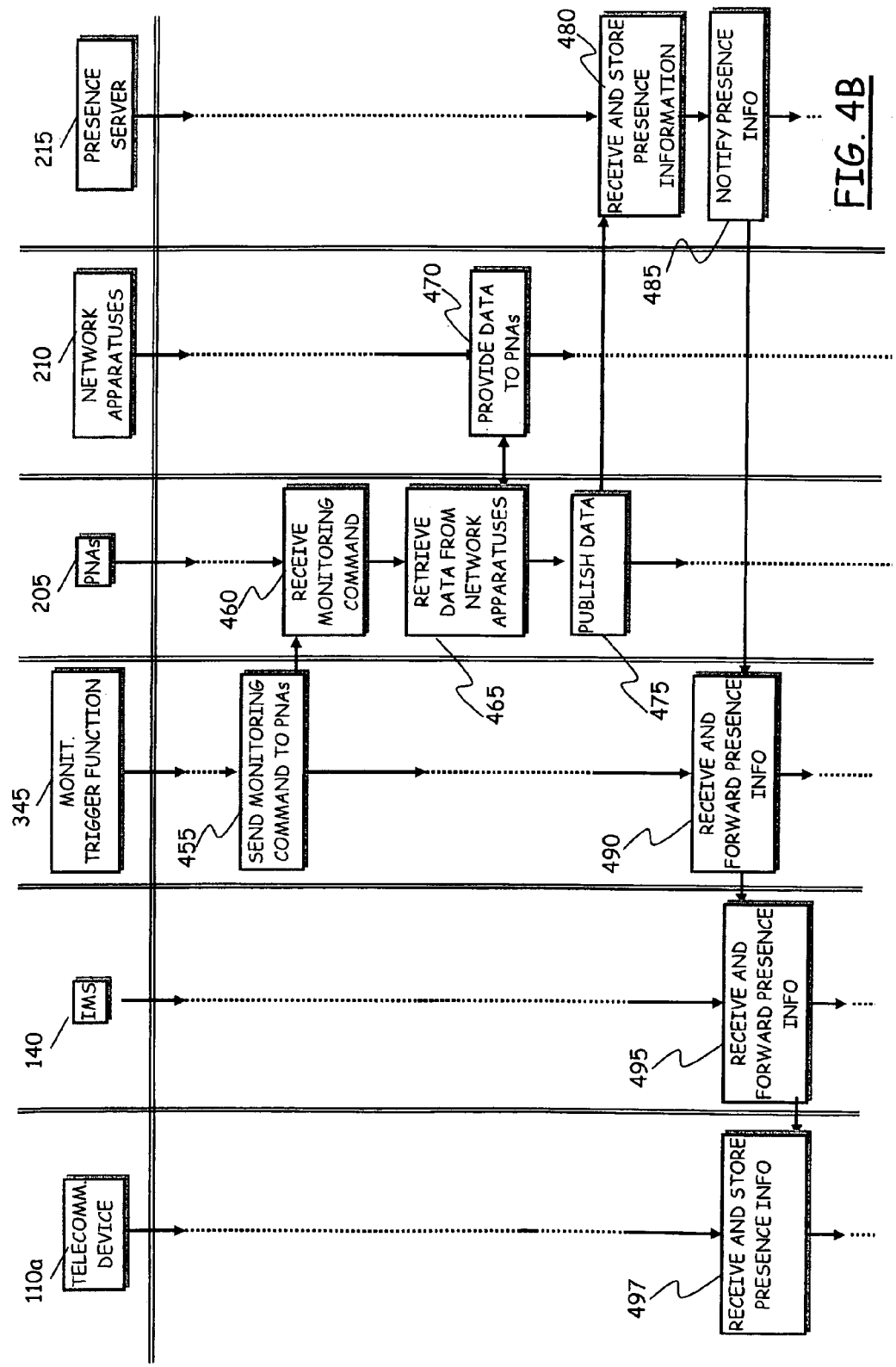
Figure 5:
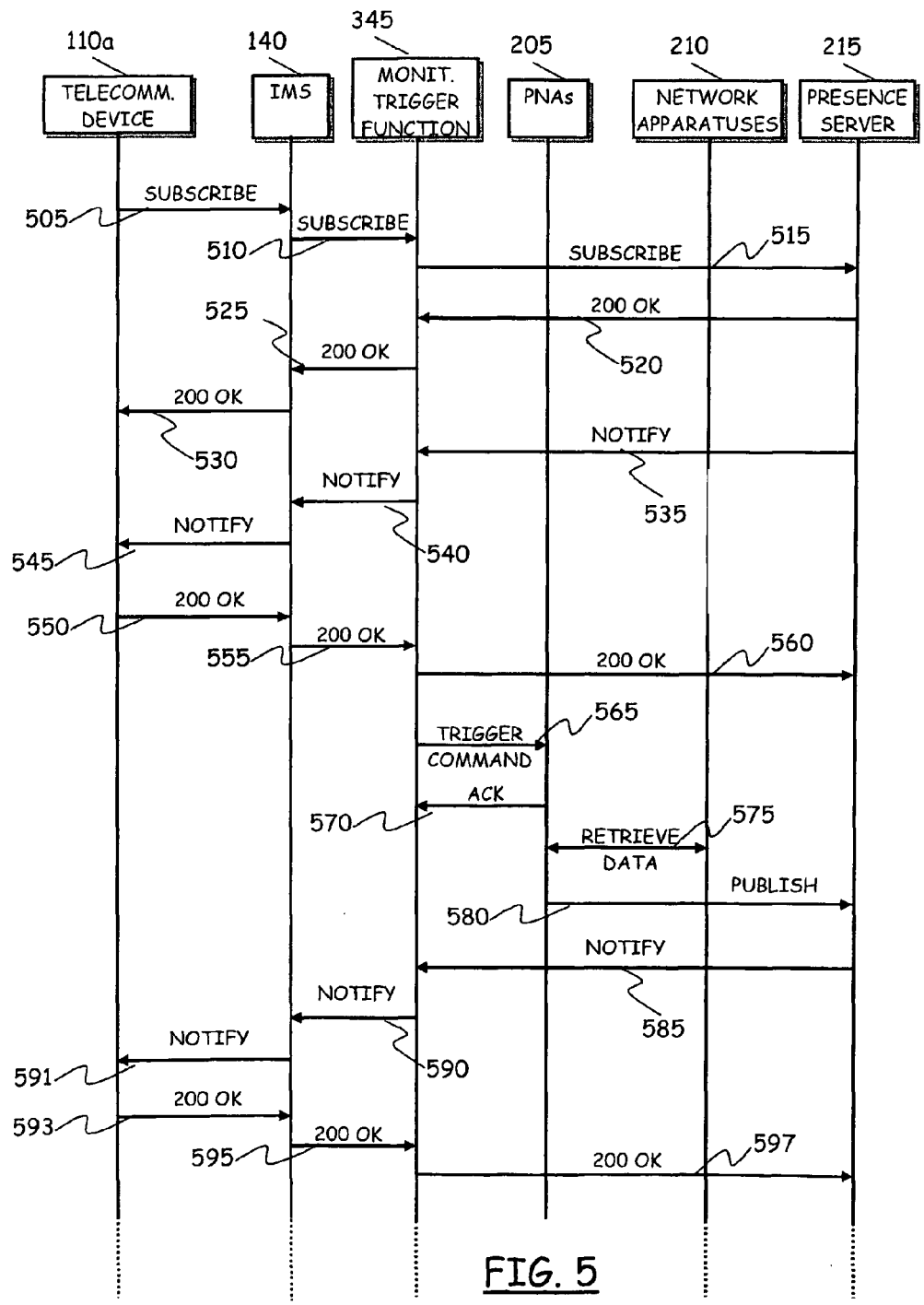
FIG. 5 illustrates the signaling between the different actors in carrying out the method according to an embodiment of the present invention.

The operation of the presence service platform of FIG. 3 will be now described in detail with the help of the flowchart of FIGS. 4A and 4B and of the signaling diagram of FIG. 5.

When a generic user, e.g. the user of the mobile telecommunication device 110a, wishes to receive presence information in respect of one or more other users, like for example the user of the mobile telecommunications device 110b of FIG. 1 (for example, of one or more users included in a buddy list), the user of the mobile telecommunication device 110a sends a request of subscription to the presence information of the specified user(s), containing the identifier, e.g. the mobile phone number(s), of said other user(s) (block 405); for example, in the IMS framework, the subscription request may consist in a message "SUBSCRIBE" 505 sent to the IMS infrastructure 140.

The IMS infrastructure 140 receives the subscription request, and forwards the same request to the monitoring trigger function 345 (block 410), for example sending a "SUBSCRIBE" message 510 thereto.

The monitoring trigger function 345 receives the subscription request, and forwards it to the presence server 215 (block 425), for example sending thereto a "SUBSCRIBE" message 515. The presence server 215 receives the subscription request and subscribes the user of the telecommunications device 110a to the presence service (block 430).

The presence server 215 may preferably acknowledge receipt of the subscription request to the monitoring trigger function 345, for example sending thereto a "200 OK" message 520; the monitoring trigger function, upon receipt of the 200 OK" message 520, may acknowledge the IMS infrastructure 140, once again issuing for example a "200 OK" message 525; in turn, the IMS infrastructure 140, upon receipt of the "200 OK" message 525 from the monitoring trigger function 345, may acknowledge the mobile telecommunications device 110a, for example sending thereto a "200 OK" message 530. The receipt of the "200 OK" message 530 informs the client 250 resident on the mobile telecommunications device 110a that the subscription request has been successful.

The subscription request, which, as mentioned in the foregoing, contains the identifier(s) of the user(s) of whom presence information is desired, allows the presence server 215 to generate notifications containing the presence information in respect of such identified user(s). In particular, and by way of example, upon subscription of the user of the mobile telecommunications device 110a to the presence service, the presence server may readily notify to the mobile telecommunications device 110a the presence information in respect of the identified users (block 435), for example issuing a "NOTIFY" message 535 to the monitoring trigger function 345. The monitoring trigger function receives and forwards the presence information to the IMS infrastructure 140 (block 440), for example issuing thereto a "NOTIFY" message 540. The IMS infrastructure 140 receives and forwards the presence information to the client 250 resident on the mobile telecommunications device 110a (block 445), for example issuing thereto a "NOTIFY" message 545.

The client 250 running on the mobile telecommunications device 110a of the user who requested the presence information receives and stores the presence information of the users in the buddy list, for example the user of the mobile telecommunication device 110b; the presence information is used by the watcher agent running on the device 110a for, e.g., displaying particular indications in respect of the buddy user of the device 110b.

The mobile telecommunications device 110a may preferably acknowledge receipt of the presence information to the IMS infrastructure 140, for example sending thereto a "200 OK" message 550; the IMS platform 140, upon receipt of the 200 OK" message 550, may acknowledge the monitoring trigger function 345, once again issuing for example a "200 OK" message 555; in turn, the monitoring trigger function 345, upon receipt of the "200 OK" message 555 from the IMS infrastructure 140, may acknowledge the presence server 215, for example sending thereto a "200 OK" message 560.

Preferably upon receipt of the "200 OK" message from the presence server 215 acknowledging the subscription of the user of the mobile telecommunications device 110a to the presence service (or to the presence information related to the user of the mobile telecommunications device 110b), the monitoring trigger function 345 sends a start monitoring command to the PNAs 205 (block 455), thereby instructing them to start monitoring the selected user(s) whose identifier (s) were specified in the subscription request from the user of the mobile telecommunication device 110a. For example, the monitoring trigger function may send to the PNAs 205 a "SUBSCRIBE" message 565, or a similar message, specifying the identifier(s) of the user(s) to be monitored; in particular, the message sent by the monitoring trigger function 345 to the PNAs 205 may be a copy of the "SUBSCRIBE" message 510 received from the IMS infrastructure 140. The PNAs 205 may acknowledge receipt of the start monitoring command to the monitoring trigger function, by means of an acknowledge message 570, for example a "200 OK" message.

The PNAs 205, which, by default, do not collect data from the network apparatuses 210 in respect of any users, upon receipt of the start monitoring command from the monitoring trigger function 345 (block 460) start monitoring the user(s) specified in the received command, e.g. the user of the mobile telecommunication device 110b, retrieving data related thereto from the network apparatuses 210 (blocks 465 and 470, and signaling 575).

The PNAs 205 then publish the retrieved data on the presence server (block 475), for example through "PUBLISH" messages 580.

The presence server 215 arranges the received data (block 480) and notifies them, making them available to, e.g., the watcher agent running on the mobile telecommunication device 110a of the user who requested the presence information; presence information related to the buddy users, for example the user of the mobile telecommunication device 110b, is thus used by the watcher agent running on the device 110a for, e.g., displaying particular indications in respect of the buddy user of the device 110b. The notification of the presence information takes place similarly to the way described above: the presence server 215 issues a "NOTIFY" message 585 to the monitoring trigger function 345 (block 485). The monitoring trigger function 345 receives and forwards the presence information to the IMS infrastructure 140 (block 490), for example issuing thereto a "NOTIFY" message 590. The IMS infrastructure 140 receives and forwards the presence information to the client 250 resident on the mobile telecommunications device 110a (block 490), for example issuing thereto a "NOTIFY" message 591.

The client 250 running on the mobile telecommunications device 110a receives and stores the presence information (block 497). The mobile telecommunications device 110a may preferably acknowledge receipt of the presence information to the IMS infrastructure 140, for example sending thereto a "200 OK" message 593; the IMS platform 140, upon receipt of the 200 OK" message 593, may acknowledge the monitoring trigger function 345, once again issuing for example a "200 OK" message 595; in turn, the monitoring trigger function 345, upon receipt of the "200 OK" message 595 from the IMS infrastructure 140, may acknowledge the presence server 215, for example sending thereto a "200 OK" message 597.

When the presence server 215 receives from the PNAs 205 data different from those already stored, the presence server 215 notifies the client 250 running on the mobile telecommunications device 110a, so that the presence information in respect of the user(s) in the buddy list is kept updated.

In this way, the amount of presence information published on the presence server, as well as the interrogations by the PNAs to the network apparatuses and the data retrieved therefrom, can be significantly limited, because presence information are published only in respect of users for whom someone has requested to have presence information.

It is observed that, in the SIP protocol, "SUBSCRIBE" messages are characterized by a limited validity time, specified within the messages themselves (by a field named "expire"); moreover, it is possible to withdraw a subscription by sending a "SUBSCRIBE" message having an "expire" field valued to zero: in the IMS framework, this is interpreted as an unsubscribe message.

Based on the above, several implementations are possible. For example, the monitoring trigger function 345, each time it receives a "SUBSCRIBE" message, may send a start monitoring command to all the PNAs including the identifier(s) of the specified user(s) in respect of whom presence information is desired. Upon receipt of the start monitoring command, the PNAs may update the presence server, publishing the data retrieved from the network apparatuses, or wait, in case the time lapsed from the preceding data publishing does not exceed a predetermined time.

The monitoring trigger function 345, upon receiving an unsubscribe message (i.e., as discussed before, a "SUBSCRIBE" message with the attribute "expire" set to zero), may instruct the PNAs to stop the monitoring of the specified user(s), i.e. to stop retrieving data related thereto from the network apparatuses; this can for example be done by sending to the PNAs a copy of the unsubscribe message.

The monitoring trigger function 345 may keep a timer corresponding to the expiry time of the received subscription requests, so that if, at the expiry of a subscription request, no "fresh" "SUBSCRIBE" messages are received from the users' mobile telecommunication devices, the monitoring trigger function may send an unsubscribe command to the PNAS.

The monitoring trigger function 345 may also, upon receiving a "SUBSCRIBE" message, check an internal timer associated with the user(s) specified in the "SUBSCRIBE" message, i.e. the user(s) in respect of whom the presence information are to be published. If the monitoring trigger function 345 ascertains that the time lapsed from the last received "SUBSCRIBE" message for the same user(s) is less than a predetermined time, the monitoring trigger function may decide not to send the monitoring command to the PNAs.

Furthermore, the monitoring trigger function 345 may, upon receiving a "SUBSCRIBE" message, increment a counter value in respect of the user(s) specified in the "SUBSCRIBE" message, i.e. the user(s) in respect of whom the presence information are to be published, whereas the counter value is decreased when an unsubscribe message is received. Thus, the monitoring trigger function 345 may send the unsubscribe instruction to the PNAs only when the counter value reaches zero, meaning that no one is any longer interested in the presence information of a specified user, and that the monitoring of the specified user should be stopped.

Combinations of the solutions just discussed are also possible.

It is pointed out that in the exemplary embodiment described in the foregoing, the monitoring trigger function is assumed to be implemented in the form of a proxy, so that all the SIP messages between the IMS infrastructure and the presence server transit therethrough; however, this is not to be construed as a limitation: in alternative embodiments, it may be provided that not all the SIP messages transit through the monitoring trigger function, for example the "NOTIFY" messages by which the presence server notifies to the watcher agents the presence information, and the corresponding "200 OK" reply messages may go directly from the presence server to the IMS infrastructure and vice versa. In the case the monitoring trigger function is implemented in the form of a message interceptor, the SIP messages do not transit through the monitoring trigger function, which merely listens to the traffic and, when detects a message indicating a request of subscription to the presence service, sends to the PNAs the start monitoring command.

Figure 6:
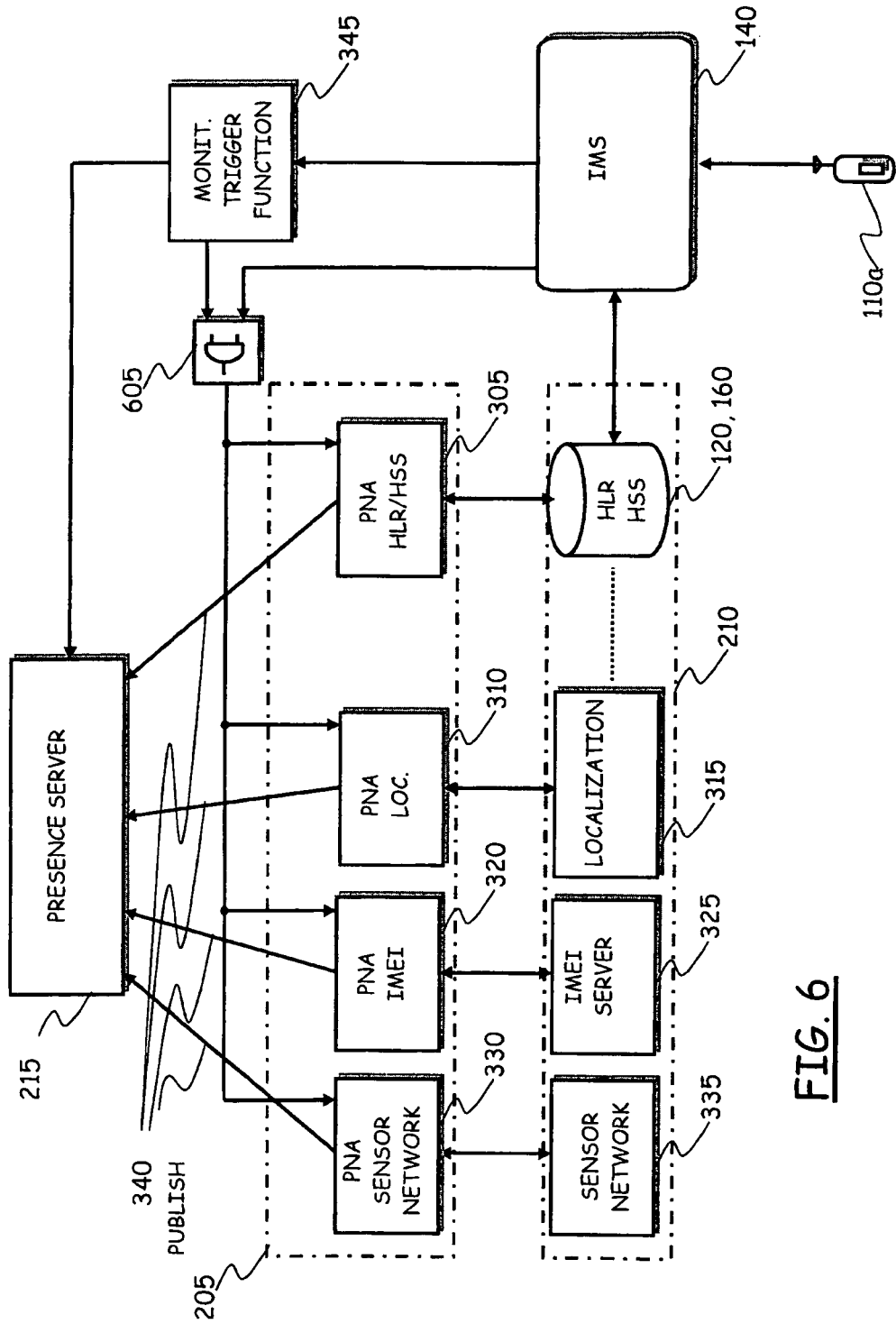
FIG. 6 schematically shows, in terms of functional blocks, another embodiment of a presence service platform according to the present invention.

FIG. 6 schematically shows another embodiment of the present invention, which will be discussed in the following.

Specifically, in order for the PNAs 205 to start monitoring a certain user, e.g. the user of the mobile telecommunication device 110b, and thus to retrieve data related thereto from the network apparatuses, it is not only necessary that someone, like the user of the device 110a, requests presence information in respect of such user, as described in connection with the first invention embodiment above described; it is also necessary that the user whose presence information are requested be currently registered to the telecommunications network.

In an IMS framework, the information about the current registered/deregistered status of a user may be derived from a "REGISTER" SIP message issued by IMS client applications running on the mobile telecommunication devices to the IMS infrastructure 140 (received by the CSCF). Upon receiving such "REGISTER" SIP message from a certain mobile telecommunication device, e.g. the device 110b, the IMS infrastructure 140 may issue the command for notifying the PNAs that the user of the device 110b is currently registered to the network; for example, the command issued by the IMS infrastructure 140 may be a "THIRD PARTY REGISTER" SIP message, a standard message by means of which the CSCF can notify the registered state of a certain user to third-party applications (implemented for example in the application server 165).

It is pointed out that the information about the current registered/deregistered status of a user may be published by one of the PNAs 205: one of the PNAs, having the function of publishing on the presence server 215 the information about the current registered/deregistered state of the users, may be coupled to the CSCF of the IMS infrastructure to notify thereto when a user registers/deregisters to/from the network.

The above described behavior is schematized in the drawing by a block 605, operating as a logic AND gate, adapted to cause the PNAs receive the start monitoring command only on condition that the monitoring trigger function 345 has issued such a command in response to a subscription request coming from a user, and that the "THIRD PARTY REGISTER" SIP message has been issued by the IMS infrastructure 140.

The second embodiment of the invention described above allows combining a "subscription-based" method according to the first invention embodiment, with a "registration-based" method. This allows further reducing the load on the network apparatuses by the PNAs, and the amount of data to be published on the presence server, because presence information in respect of a user is published only in case that user is currently registered, and someone has requested presence information in respect of such user.

The logic AND gate schematized in FIG. 6 by the block 605 may be implemented at the level of the single PNA; for example, the PNA associated with the localization platform may expediently start monitoring a certain user when someone specifies that such a user has to be monitored, but also on condition that the user to be monitored is registered.

Thanks to the present invention, it is possible to reduce the load of the presence network agents on the network, limiting the frequency by which the network apparatuses are inquired for retrieving data useful to build-up the presence information. The amount of data published on the presence server is also reduced.

The Applicant believes that the advantages of the present invention are particularly apparent in the starting phases of the implementation of the presence services, when the users who subscribe to the service are relatively limited in number: thanks to the present invention, the amount of presence information published on the presence server might be kept relatively low.

The present invention has been disclosed and described by way of some embodiments thereof, however it is apparent to those skilled in the art that several modifications to the described embodiments, as well as other embodiments of the present invention are possible, for example for meeting contingent needs, without departing from the scope thereof as defined in the appended claims.

For example, although described by making reference to a mobile telephony network scenario, the invention is not limited to this, and can be more generally applied to any wireless or wired telecommunications network, particularly networks not implementing the IMS; for example, the present invention may be readily applied to different platforms like Wireless Village, Microsoft LCS (Live Communications Server), or plain GSM. Irrespective of the specific context, it is possible to identify at least one of the typical signaling that may be exploited for causing the sending to the PNAs of the start monitor command, and/or the information about the current registered/deregistered status of the users.

The functions of the monitoring trigger function 345 described in the foregoing may be implemented in any apparatus of the subscription chain; such functions might as well be implemented in the presence server, in the presence list server, or in the IMS infrastructure.

Furthermore, nothing prevents that there may be messages exchanged directly between the presence server and the IMS infrastructure, for completing the users' preference information.

The invention claimed is:

1. A method for providing presence information associated with a first user of a telecommunications network, comprising:
   collecting from at least one network apparatus user-related data adapted to build the presence information of said first user;
   publishing collected user-related data, wherein said publishing comprises arranging the collected user-related data in the presence information;
   conditioning said collecting to receipt from at least a second user of a request for providing the presence information for said first user;
   varying a counter value in a first direction each time a request for providing the presence information is received;
   varying the counter value in a second direction opposite to the first direction each time a request to stop providing the presence information is received; and
   instructing a presence network agent server to stop collecting the user-related data of said first user when the counter value reaches a predetermined value.

2. The method of claim 1, wherein said conditioning comprises providing to the presence network agent server associated with said at least one network apparatus, an instruction to start collecting the user-related data upon receipt of said request from the second user.

3. The method of claim 2, wherein upon receipt of said instruction, the presence network agent server performs said collecting conditioned on the fact that a time lapsed from a previous collecting of said user-related data exceeds a predetermined time.

4. The method of claim 1, further comprising:
   upon receiving from said at least one second user a request to stop providing the presence information of said first user, instructing the presence network agent server to stop collecting the user-related data of said first user.

5. The method of claim 1, further comprising:
   instructing the presence network agent server to stop collecting the user-related data of said first user after a predetermined time from the receipt of said request for providing the presence information of said first user.

6. The method of claim 1, further comprising conditioning said collecting to request for registration of said first user to the telecommunications network.

7. The method of claim 1, wherein the telecommunications network comprises an intranet protocol multimedia subsystem infrastructure, and said request for providing the presence information of said first user comprises a session initiation protocol "SUBSCRIBE" message issued from a telecommunications device of the at least one second user.

8. The method of claim 7, wherein said conditioning comprises providing to a presence network agent server associated with said at least one network apparatus an instruction to start collecting the user-related data upon receipt of said request from the second user, and wherein said instruction to start collecting the user-related data comprises a session initiation protocol "SUBSCRIBE" message sent to the at least one presence network agent server.

9. The method of claim 7, further comprising conditioning said collecting to a request for registration of said first user to the telecommunications network, wherein said request for registration of said first user comprises a session initiation protocol "REGISTER" message issued from a telecommunications device of the first user.

10. A system for providing presence information associated with a first user of a telecommunications network, comprising:
  at least one network apparatus;
  at least one presence network agent server operatively associated with the at least one network apparatus and capable of being adapted to collect from the at least one network apparatus user-related data capable of being adapted to build the presence information;
  a presence server operatively associated with the at least one presence network agent server and capable of being adapted to receive therefrom the collected user-related data and to arrange the collected user-related data in the presence information; and
  a network function server capable of being adapted to:
    condition said collecting by the at least one presence network agent server to receipt from at least a second user of a request for providing the presence information for said first user;
    vary a counter value in a first direction each time a request for providing the presence information is received;
    vary the counter value in a second direction opposite to the first direction each time a request to stop providing the presence information is received; and
    instruct the at least one presence network agent server to stop collecting the user-related data of said first user when the counter value reaches a predetermined value.

11. The system of claim 10, wherein said network function server comprises a proxy capable of being adapted to receive messages directed to the presence server, manage received messages and re-address the received messages to the presence server.

12. The system of claim 10, wherein said network function server comprises a message interceptor capable of being adapted to sense messages directed to the presence server and to detect messages carrying said request for providing the presence information for said first user.

13. The system of claim 10, wherein said network function server, upon receipt of said request from the said user, is capable of being adapted to send to said at least one presence network agent server, an instruction to start collecting the user-related data.

14. The system of claim 13, wherein upon receipt of said instruction, the at least one presence network agent server is capable of being adapted to perform said collecting conditioned on the fact that a time lapsed from a previous collecting of said user-related data exceeds a predetermined time.

15. The system of claim 10, wherein said network function server is further capable of being adapted to instruct the at least one presence network agent server to stop collecting the user-related data of said first user upon receipt from said at least one second user of a request to stop providing the presence information of said first user.

16. The system of claim 10, wherein said network function server is further capable of being adapted to instruct the at least one presence network agent server to stop collecting the user-related data of said first user after a predetermined time from the receipt of said request for providing the presence information of said first user.

17. The system of claim 10, wherein at least one among said network function server or said at least one presence network agent server is further capable of being adapted to condition said collecting to a request for registration to the telecommunications network of said first user.

18. The system of claim 10, wherein the telecommunications network comprises an internet protocol multimedia subsystem infrastructure, and said request for providing the presence information for said first user comprises a session initiation protocol "SUBSCRIBE" message issued from a telecommunications device of the at least one second user.

19. The system of claim 18, wherein said network function server, upon receipt of said request from the second user, is capable of being adapted to send to said at least one presence network agent server an instruction to start collecting the user-related data, and wherein said instruction to start collecting the user-related data comprises a session initiation protocol "SUBSCRIBE" message sent to the at least one presence network agent server.

20. The system of claim 19, wherein at least one among said network function server or said at least one presence network agent server is further capable of being adapted to condition said collecting to a request for registration to the telecommunications network of said first user, and wherein said request for registration comprises a session initiation protocol "REGISTER" message issued from a telecommunications device of the first user.

21. A method of collecting user-related data comprising:
  collecting user-related data related to a first user of a telecommunications network from at least one network apparatus;
  publishing collected user-related data for building presence information associated with said first user;
  conditioning said collecting to receipt from at least a second user of a request for providing the presence information for said first user;
  varying a counter value in a first direction each time a request for providing the presence information is received;
  varying the counter value in a second direction opposite to the first direction each time a request to stop providing the presence information is received; and
  stopping collecting the user-related data of said first user when the counter value reaches a predetermined value.

22. A system for providing presence information associated with a first user of a telecommunications network, comprising:
  at least one network apparatus;
  a presence network agent server adapted for use in a telecommunications network implementing a presence service, the presence network agent server being adapted to be operatively associated with the at least one network apparatus and to collect therefrom user-related data related to a first user capable of being adapted to build the presence information associated with the first user, and to publish the user-related data; and a network function server capable of being adapted to:

condition said collecting by the at least one presence network agent server to receipt from at least a second user of a request for providing the presence information for said first user;

vary a counter value in a first direction each time a request for providing the presence information is received;

vary the counter value in a second direction opposite to the first direction each time a request to stop providing the presence information is received; and instruct the at least one presence network agent server to stop collecting the user-related data of said first user when the counter value reaches a predetermined value.

* * * * *

UNITED STATES PATENT AND TRADEMARK OFFICE
CERTIFICATE OF CORRECTION

| | | |
|---|---|---|
| PATENT NO. | : 8,472,929 B2 | Page 1 of 1 |
| APPLICATION NO. | : 12/226485 | |
| DATED | : June 25, 2013 | |
| INVENTOR(S) | : Cotevino et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this
Tenth Day of February, 2015

Michelle K. Lee
*Deputy Director of the United States Patent and Trademark Office*